(12) United States Patent
McAleer et al.

(10) Patent No.: US 9,571,348 B1
(45) Date of Patent: Feb. 14, 2017

(54) SYSTEM AND METHOD FOR INFERRING AND ADAPTING A NETWORK TOPOLOGY

(71) Applicant: Dell Software Inc., Aliso Viejo, CA (US)

(72) Inventors: David McAleer, Toronto (CA); Kelly Noel Dyer, Toronto (CA)

(73) Assignee: Dell Software Inc., Aliso Viejo, CA (US)

( * ) Notice: Subject to any disclaimer, the term of this patent is extended or adjusted under 35 U.S.C. 154(b) by 896 days.

(21) Appl. No.: 13/935,075

(22) Filed: Jul. 3, 2013

(51) Int. Cl.
*G06F 15/16* (2006.01)
*H04L 12/24* (2006.01)

(52) U.S. Cl.
CPC ................... *H04L 41/12* (2013.01)

(58) Field of Classification Search
CPC ........................................ H04L 41/12
USPC ........................................ 709/224
See application file for complete search history.

(56) References Cited

U.S. PATENT DOCUMENTS

| | | | |
|---|---|---|---|
| 6,205,122 B1 | 3/2001 | Sharon et al. | |
| 7,069,343 B2 | 6/2006 | Goringe et al. | |
| 7,366,113 B1* | 4/2008 | Chandra | H04L 41/12 370/255 |
| 7,602,728 B2 | 10/2009 | Adhikari et al. | |
| 7,990,897 B2* | 8/2011 | Jing | H04L 12/2807 370/255 |
| 9,178,769 B2* | 11/2015 | Sullivan | H04L 41/12 |
| 2003/0041167 A1* | 2/2003 | French | H04L 12/24 709/238 |
| 2003/0156552 A1* | 8/2003 | Banker | H04L 25/4908 370/266 |
| 2005/0044211 A1* | 2/2005 | Adhikari | H04L 69/40 709/224 |
| 2007/0053309 A1* | 3/2007 | Poojary | H04L 45/22 370/256 |
| 2009/0116404 A1 | 5/2009 | Mahop et al. | |

(Continued)

OTHER PUBLICATIONS

Pandey, Suman, et al., "IP Network Topology Discovery Using SNMP," Dept. of Computer Science and Engineering, Postech, Korea, Jan. 2009, 5 pages.

(Continued)

*Primary Examiner* — Bryan Lee
(74) *Attorney, Agent, or Firm* — Winstead PC

(57) ABSTRACT

In one embodiment, a method includes monitoring a network that includes a plurality of information handling systems. The plurality of information handling systems includes a plurality of computer-networking devices and a plurality of remote nodes. The method further includes creating a stored network topology. The stored network topology includes, for each of the plurality of networking devices, any direct children. The creating includes, for each networking device of the plurality of computer-networking devices, selecting the networking device, querying the networking device for topology information, and receiving the topology information from the networking device. The creating also includes adding any directly connected remote nodes to the stored network topology. In addition, the creating includes determining any new parent references that can be inferred based on the topology information. The creating further includes updating the stored network topology according to the new parent references.

20 Claims, 10 Drawing Sheets

(56) References Cited

U.S. PATENT DOCUMENTS

2009/0201840 A1 8/2009 Pfeiffer, Jr. et al.
2011/0128890 A1 6/2011 Schein et al.

OTHER PUBLICATIONS

LoriotProV4, Administrator Handbook, "The SNMP Network Discover Process," 2004, 16 pages.

* cited by examiner

SYSTEM AND METHOD FOR INFERRING AND ADAPTING A NETWORK TOPOLOGY

BACKGROUND

Technical Field

The present invention relates generally to network management and more particularly, but not by way of limitation, to systems and methods for inferring and adapting a network topology.

History of Related Art

Topology information is an integral part of maintaining and diagnosing faults in networking systems. Typically, from a central console, a network manager console or other device coupled to a networking system, at periodic intervals, requests information regarding the connectivity of nodes in the network. Bridges, concentrators, and routers may respond to these requests by providing such topology information as the number of nodes or hubs to which it is connected, the location of the nodes, and other information. From this, certain other information can be obtained that indicates a current operating state of the network. Thus, if links become unstable or fail, the above-mentioned information may be determined and corrective measures may be taken, such as correcting physical defects in the networking system and/or other corrective action. However, the above-mentioned information generally fails to provide a full topology of the network. In addition, because the topology can constantly change, identification of physical defects based on topological information is generally slow or unsuccessful.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a monitoring system, monitoring a network. The network is hierarchical and directional and includes a plurality of information handling systems. The plurality of information handling systems includes a plurality of computer-networking devices and a plurality of remote nodes. The method further includes creating, by the monitoring system, a stored network topology that is representative of a current state of the network. The stored network topology includes, for each of the plurality of networking devices, any direct children. The creating includes, for each networking device of the plurality of computer-networking devices, selecting the networking device, querying the networking device for topology information, and receiving the topology information from the networking device. The topology information includes a list of any directly connected remote nodes, a list of any downstream endpoints, and endpoint-via-remote information for each downstream endpoint. The creating also includes adding any directly connected remote nodes to the stored network topology. In addition, the creating includes determining any new parent references that can be inferred based on the topology information. The creating further includes updating the stored network topology according to the new parent references.

In one embodiment, an information handling system includes a processing unit. The processing unit is operable to implement a method. The method includes monitoring a network. The network is hierarchical and directional and includes a plurality of information handling systems. The plurality of information handling systems includes a plurality of computer-networking devices and a plurality of remote nodes. The method further includes creating a stored network topology that is representative of a current state of the network. The stored network topology includes, for each of the plurality of networking devices, any direct children. The creating includes, for each networking device of the plurality of computer-networking devices, selecting the networking device, querying the networking device for topology information, and receiving the topology information from the networking device. The topology information includes a list of any directly connected remote nodes, a list of any downstream endpoints, and endpoint-via-remote information for each downstream endpoint. The creating also includes adding any directly connected remote nodes to the stored network topology. In addition, the creating includes determining any new parent references that can be inferred based on the topology information. The creating further includes updating the stored network topology according to the new parent references.

In one embodiment, a computer-program product includes a computer-usable medium having computer-readable program code embodied therein. The computer-readable program code is adapted to be executed to implement a method. The method includes monitoring a network. The network is hierarchical and directional and includes a plurality of information handling systems. The plurality of information handling systems includes a plurality of computer-networking devices and a plurality of remote nodes. The method further includes creating a stored network topology that is representative of a current state of the network. The stored network topology includes, for each of the plurality of networking devices, any direct children. The creating includes, for each networking device of the plurality of computer-networking devices, selecting the networking device, querying the networking device for topology information, and receiving the topology information from the networking device. The topology information includes a list of any directly connected remote nodes, a list of any downstream endpoints, and endpoint-via-remote information for each downstream endpoint. The creating also includes adding any directly connected remote nodes to the stored network topology. In addition, the creating includes determining any new parent references that can be inferred based on the topology information. The creating further includes updating the stored network topology according to the new parent references.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, network topologies can be better detected in hierarchical, directional networks utilizing principles described herein. In particular, a full, network topology can be constructed via a series of queries to computer-networking devices. In addition, the network topology can be adapted to network changes in a self-healing fashion.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
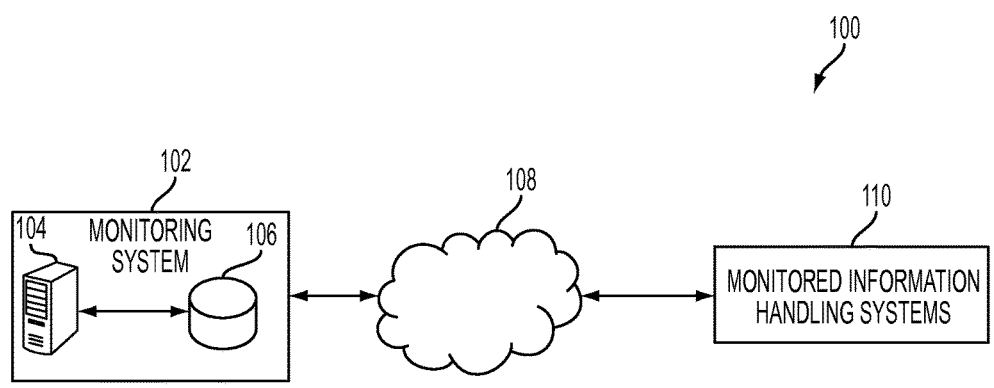
FIG. 1 illustrates a system for topology detection.

FIG. 1 illustrates a system 100 for topology detection. The system 100 includes a monitoring system 102 communicating with a plurality of monitored information handling systems 110 over a communications network 108. In some embodiments, the monitoring system 102 monitors and controls the monitored information handling systems 110. For example, in various embodiments, the monitoring system 102 may encompass an industrial control system such as, for example, a supervisory control and data acquisition (SCADA) system or a distributed control system (DCS). In various other embodiments, the monitoring system 102 is merely representative of network node that is not necessarily distinct from the monitored information handling systems 110.

It should be appreciated that the communications network 108 is intended to abstract a plurality of networks over which the monitoring system 102 may be operable to communicate. In particular, the communications network 108 logically represents all communication infrastructure for connecting the monitoring system 102 to each of the monitored information handling systems 110. The communications network 108 can include any number of wired and/or wireless communications networks such as, for example, public or private intranets, the Internet, public switched telephone networks (PSTNs), cellular networks, satellite communication, and the like. To the extent a particular information handling system of the monitored information handling systems 110 connects to the monitoring system 102 through others of the monitored information handling systems 110, for purposes of communication between the monitoring system 102 and the particular information handling system, the communications network 108 can be considered to include those other information handling systems.

In a typical embodiment, subsets of the monitored information handling systems 110 may be interconnected. Each interconnected subset may be arranged into a network topology that is hierarchical and directional. In this manner, some of the monitored information handling systems 110 may be effectively dependent upon others of the monitored information handling systems 110. The monitored information handling systems 110 may also be geographically dispersed on a global level. For convenient description, the monitored information handling systems 110 may be considered to include, inter alia, computer-networking devices and remote nodes.

For purposes of this patent application, computer-networking devices are information handling systems serving as networking equipment that, for example, route/forward traffic between two or more networks or subnetworks and/or provide access to a network. Computer-networking devices can include, for example, routers, switches, bridges, hubs, wireless access points, gateways, a combination of same, and/or the like. For purposes of this patent application, a remote node is an information handling system that is operable to connect to a computer-networking device via, for example, a wired or wireless connection. Remote nodes can include, for example, field devices (e.g., programmable logic controllers (PLCs)) that control or monitor local operations such as opening and closing valves and breakers, sensor systems, remote terminal units (RTUs) that connect to and gather data from sensor systems, and the like. Remote nodes can also include, for example, server computers, desktop computers, laptop computers, tablet computers, and smartphones.

The monitoring system 102 is operable to periodically issue commands to those of the monitored information handling systems 110 that are computer-networking devices. The commands may request certain data such as, for example, topological information. The monitored information handling systems 110, in turn, are operable to provide topological information that, collectively, allows the monitoring system 102 to compile a network topology. Examples will be described with respect to FIGS. 5-9.

Figure 2:
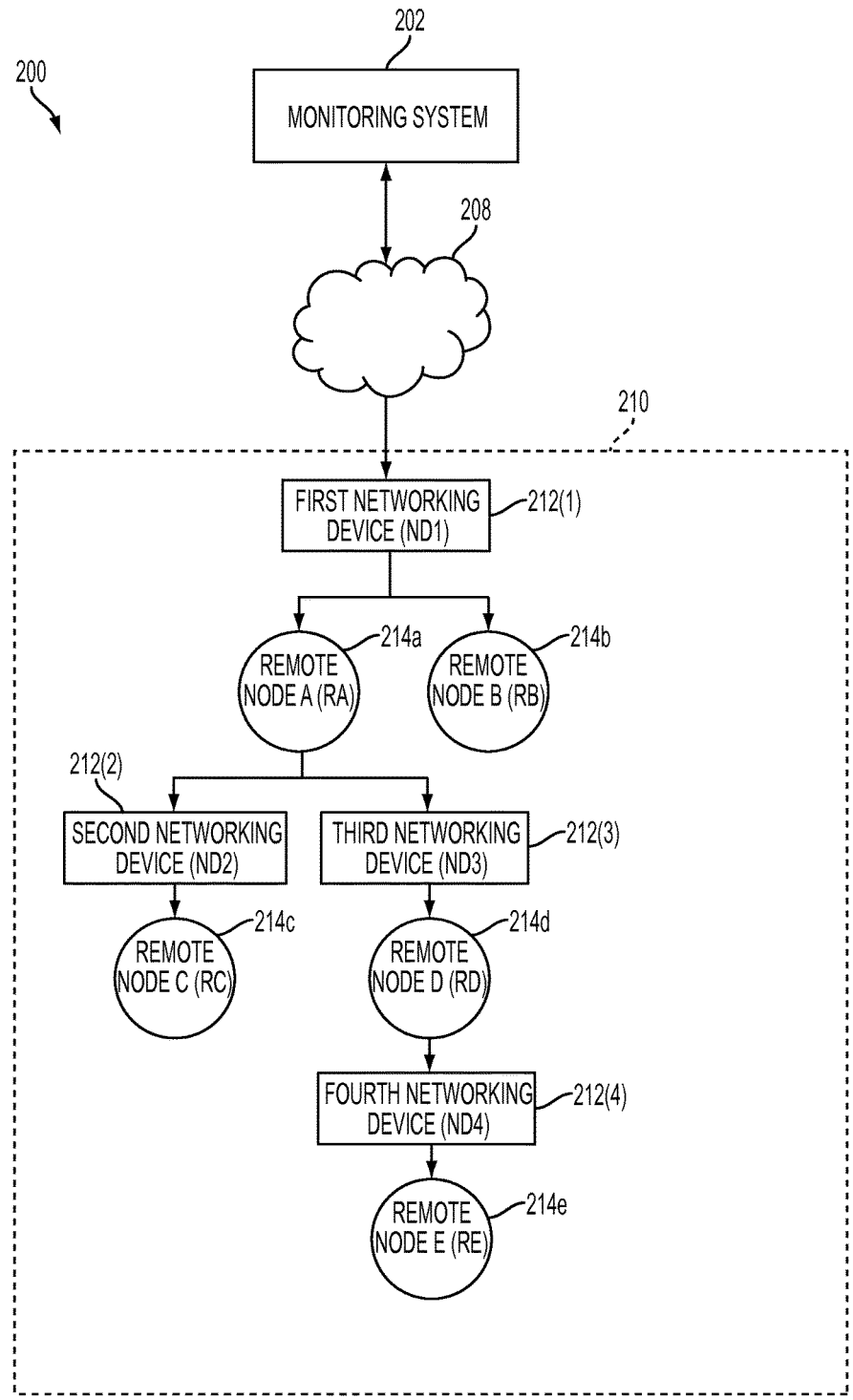
FIG. 2 illustrates a system for topology detection.

FIG. 2 illustrates a system 200 for topology detection. The system 200 includes a monitoring system 202, a communications network 208, and monitored information handling systems 210. In a typical embodiment, the monitoring system 202, the communications network 208, and the monitored information handling systems 210 operate as described with respect to the monitoring system 102, the communications network 108, and the monitored information handling systems 110, respectively, of FIG. 1. The monitored information handling systems 210 include a first networking device (ND1) 212(1), a second networking device (ND2) 212(2), a third networking device (ND3) 212(3), and a fourth networking device (ND4) 212(4) (collectively, a plurality of computer-networking devices (NDs) 212). The monitored information handling systems 210 further include a remote node A (RA) 214a, a remote node B (RB) 214b, a remote node C (RC) 214c, a remote node D (RD) 214d, and a remote node E (RE) 214e (collectively, a plurality of remote nodes 214).

The monitored information handling systems 210 are shown to be arranged in an illustrative network topology. It should be appreciated, however, that the illustrative network topology is depicted in order to provide an example of a topology that the monitoring system 102 is operable to detect and adapt responsive to changes. At any given point, the monitored information handling systems 210 can include, for example, any number of remote nodes and any number of computer-networking devices. Further, the monitored information handling systems 210 can be arranged in any number of topologies. In a typical embodiment, such topologies are hierarchical and directional beginning with a first computer-networking device (e.g., the ND1 212(1)).

In a typical embodiment, the plurality of NDs 212 each maintain a set of topology information and are operable to provide the topology information via, for example, a Simple Network Management Protocol (SNMP) interface. For a given ND, the set of topology information identifies each ND and remote node that is downstream of the ND in the network topology. An example of the set of topology information will be described with respect to FIG. 3.

As described in greater detail below, the monitoring system 202 is operable to maintain management data that includes a network topology of the monitored information handling systems 210. In particular, the monitoring system 202 is operable to aggregate the set of topology information from each of the plurality of NDs 212 and thereby detect the network topology. It should be appreciated that, in various embodiments, the monitored information handling systems 210 can include multiple networks. Therefore, in various embodiments, the monitoring system 202 is operable to detect multiple network topologies among the monitored information handling systems 210.

Figure 3:
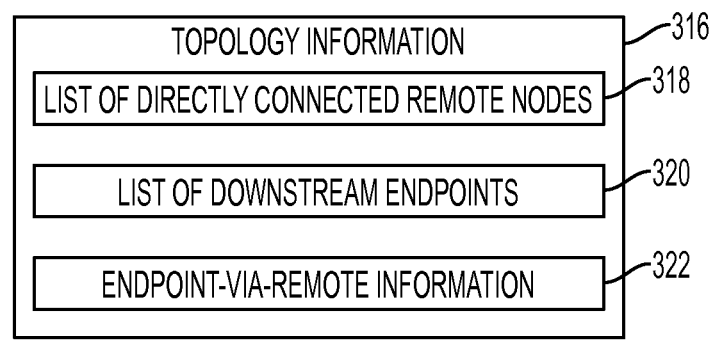
FIG. 3 illustrates an example of topology information.

FIG. 3 illustrates an example of topology information 316. The topology information 316 may be maintained, for example, by each of the plurality of NDs 212 of FIG. 2. The topology information 316 includes a list of directly connected remote nodes 318, a list of downstream endpoints 320, and endpoint-via-remote information 322.

The list of directly connected remote nodes 318 typically lists those remote nodes that connect directly to a given computer-networking device. For example, with reference to FIG. 2, the ND1 212(1) has two directly connected remote nodes (i.e., the RA 214a and the RB 214b), the ND2 212(2) has one directly connected remote node (i.e., the RC 214c), the ND3 212(3) has one directly connected remote node (i.e., the RD 214d), and the ND4 212(4) has one directly connected remote node (i.e., the RE 214e). The list of directly connected remote nodes 318 can identify each remote node by a unique network identifier such as, for example, a media access control (MAC) address.

The list of downstream endpoints 320 typically lists those monitored information handling systems that are not directly connected to a given computer-networking device but are downstream of the given computer-networking device. The list of downstream endpoints 320 is typically inclusive of both computer-networking devices and remote nodes. For example, with respect to FIG. 2, those of the monitored information handling systems 210 that appear beneath the RA 214a and the RB 214b (i.e., downstream) would appear in the list of downstream endpoints 320 for the ND1 212(1). It should be appreciated that, because the ND1 212(1) is positioned at a top of the illustrative network topology, which is hierarchical, the list of downstream endpoints 320 for the ND1 212(1) would be longer than the list of downstream endpoints for any other of the plurality of NDs 212. As described in greater detail with respect to FIGS. 3-9, knowledge of this fact can facilitate network-topology detection.

For a given ND, the endpoint-via-remote information 322 can provide supplementary topology information for endpoints listed in the list of downstream endpoints 320. In particular, the endpoint-via-remote information 322 can identify, for each endpoint in the list of downstream endpoints 320, via which directly connected remote node the endpoint is connected to the given ND. For example, with respect to FIG. 2, the endpoint-via-remote information 322 for the ND3 212(3) could indicate that the ND4 212(4) and the RE 214e are each connected via the RD 214d.

Figure 4:
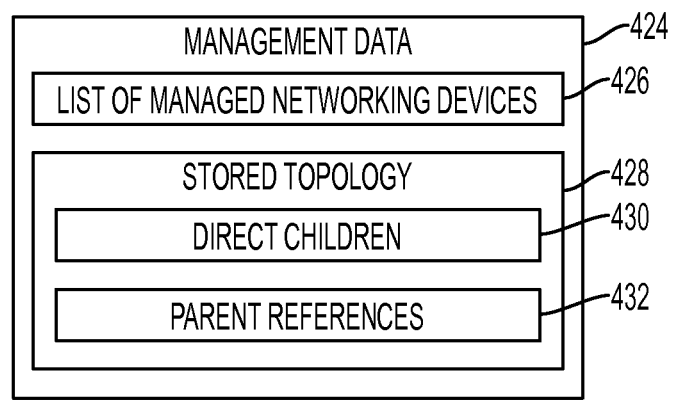
FIG. 4 illustrates management data.

FIG. 4 illustrates management data 424 that may be maintained by a monitoring system such as, for example, the monitoring system 102 of FIG. 1 or the monitoring system 202 of FIG. 2. The management data 424 includes a list of managed networking devices 426 and a stored topology 428. The list of managed networking devices 426 identifies those computer-networking devices that are being managed by the monitoring system and from which the monitoring system is authorized to collect topology information. For example, with respect the monitoring system 202 of FIG. 2, the list of managed networking devices 426 could include all or a subset of the plurality of NDs 212. In a typical embodiment, if all of the plurality of NDs 212 are authorized and included on the list of managed networking devices 426, the monitoring system 202 is guaranteed of being able to detect a full network topology of the monitored information handling systems 210. The list of managed networking devices 426 may identify the managed networking devices, for example, by MAC address, Internet Protocol (IP) address, and/or the like.

The stored topology 428 is the monitoring system's representation of a current state of a network topology. Although various examples are described herein, it should be appreciated that the current state of the network topology can be stored in numerous types of data structures. For example, in various embodiments, any data structure suitable for representing a tree structure can be utilized. As shown, the stored topology 428 can include, for each managed networking device, direct children 430 and a parent reference 432. The stored topology 428 can also include other information such as, for example, any of the topology information 316 described with respect to FIG. 3. The direct children 430 generally correspond to the list of directly connected remote nodes 318 as described with respect to FIG. 3. If a given networking device is a root of the stored topology 428, the parent reference 432 so indicates. Otherwise, the parent reference 432 serves to identify a remote node directly above the given networking device in a hierarchy of the stored topology 428. The parent reference 432 can be any identifier for the remote node such as, for example, a MAC address or IP address.

Over the course of topology detection, the parent reference 432 may be either unknown or inferred. In a typical embodiment, if a given networking device has not appeared in endpoint-via-remote information (e.g., the endpoint-via-remote information 322 of FIG. 3) for any other networking device, the parent reference 432 for that networking device is unknown. However, in a typical embodiment, if the given networking device has appeared in the endpoint-via-remote information of at least one other networking device, the parent reference 432 for that networking device can be inferred.

Inferring the parent reference 432 involves identifying a most-downstream networking device that lists the given networking device in its list of downstream endpoints (e.g., the list of downstream endpoints 320 of FIG. 3). Consider networking device X, where networking device W is the most-downstream networking device that lists X. In the context of hierarchical, directional networks, it should be appreciated that any networking device that lists X in its list of downstream endpoints should also list all directly connected remote nodes of X and all endpoints in the list of downstream endpoints for X. W is the networking device having the shortest list of downstream endpoints such that X is listed. In such a case, W generally has endpoint-via-remote information identifying one of its directly connected remote nodes (i.e., RZ) as linking W and X. Once W has been identified, the parent reference 432 for X can be inferred and set to an identifier for RZ (e.g., a MAC address for RZ). Examples of determining the parent reference 432 will be described in greater detail with respect to FIGS. 6A-6D.

Figure 5:
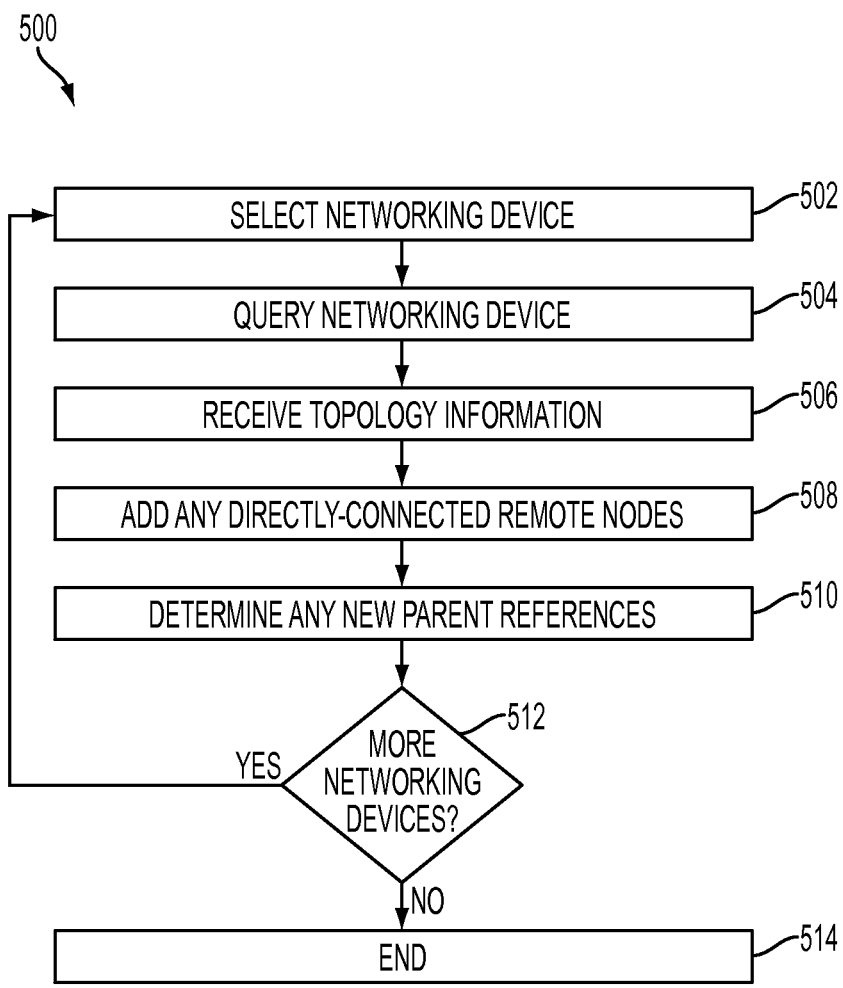
FIG. 5 illustrates a process for detecting a network topology.

FIG. 5 illustrates a process 500 for detecting a network topology. In particular, the process 500 is illustrative of initially detecting the network topology when no prior topology information has been obtained (e.g., when a system first comes online). The process 500 begins at step 502. The process 500 is typically performed by a monitoring system such as, for example, the monitoring system 102 of FIG. 1 or the monitoring system 202 of FIG. 2.

At step 502, the monitoring system selects a networking device. In a typical embodiment, the monitoring system iterates through each networking device listed in a list of managed networking devices such as, for example, the list of managed networking devices 426 of FIG. 4. It should be appreciated that the monitoring system can proceed in a predetermined order, a random order, a computed order based on specific criteria, and/or the like. From step 502, the process 500 proceeds to step 504.

At step 504, the monitoring system queries the selected networking device for topology information such as, for example, the topology information 316 of FIG. 3. The monitoring system can query the selected networking device via, for example, a SNMP interface of the selected networking device. From step 504, the process 500 proceeds to step 506. At step 506, the monitoring system receives the topology information from the selected networking device. From step 506, the process 500 proceeds to step 508. At step 508, the monitoring system adds any directly connected remote nodes to a stored topology such as the stored topology 428. For example, the directly connected remote nodes may be added as direct children (e.g., the direct children 430 of FIG. 4) of the selected networking device. From step 508, the process 500 proceeds to step 510.

At step 510, the monitoring system determines any new parent references based on the topology information received at step 508. Parent references such as, for example, the parent references 432 of FIG. 4, can be updated accordingly as described with respect to FIG. 4. Each new parent reference will typically replace an existing unknown or inferred parent reference. For example, it may be that the topology information received at step 508 enables identification of a new most-downstream networking device as described with respect to FIG. 4. The process 500 generally begins with each parent reference being unknown. From step 510, the process 500 proceeds to step 512.

At step 512, the monitoring system determines whether there are additional networking devices through which the process 500 has not yet iterated. If so, the process 500 returns to step 502 for selection of another networking device. Otherwise, if it is determined at step 512 that there are no additional networking devices through which the process 500 has not yet iterated, the process 500 proceeds to step 514 and ends.

FIGS. 6A-6D illustrate an example of topology detection according to a topology-detection process such as, for example, the process 500 of FIG. 5. Specifically, FIGS. 6A-6D depict detection of the illustrative network topology of FIG. 2 by the monitoring system 202 of FIG. 2. For purposes of this example, the monitoring system maintains a list of managed networking devices such as, for example, the list of managed networking devices 426 of FIG. 4, that includes the ND1 212(1), the ND2 212(2), the ND3 212(3), and the ND4 212(4).

As described above with respect to the process 500, topology detection can iterate through the list of managed networking devices in any order. For purposes of example, FIGS. 6A-6D will be described with an illustrative order of: the ND2 212(2), the ND4 212(4), the ND1 212(1), and the ND3 212(3). During the detection, the monitoring system 202 develops and maintains a stored topology such as, for example, the stored topology 428 of FIG. 4. Table 1 below provides an example of topology information that can be provided by the plurality of NDs 212. Table 2 maps the remote-node MAC addresses of Table 1 to the nomenclature of FIG. 2 (i.e., RA through RE).

TABLE 1

| Monitored Information Handling System | MAC | IP | Directly Connected Remote | Downstream Endpoints Nodes | Endpoint-Via-Remote Information |
|---|---|---|---|---|---|
| ND 1 | <MAC-m> | <IP-1> | <MAC-n>, <MAC-o> (and IP address of each) | <MAC-p> <MAC-q> <MAC-r> <MAC-s> <MAC-t> <MAC-u> | <MAC-n> <MAC-n> <MAC-n> <MAC-n> <MAC-n> <MAC-n> |
| ND2 | <MAC-p> | <IP-2> | <MAC-q> (and IP address) | None | None |
| ND3 | <MAC-r> | <IP-3> | <MAC-s> (and IP address) | <MAC-t> <MAC-u> | <MAC-s> <MAC-s> |
| ND4 | <MAC-t> | <IP-4> | <MAC-u> (and IP address) | None | None |

TABLE 2

| Remote Node | MAC Address |
|---|---|
| RA | <MAC-n> |
| RB | <MAC-o> |
| RC | <MAC-q> |
| RD | <MAC-s> |
| RE | <MAC-u> |

When the monitoring system 202 queries the ND2 212(2), the monitoring system 202 receives the topology information indicated for the ND2 212(2) in Table 1. Because the ND2 212(2) has no downstream endpoints and no endpoint-via-remote information, no parent references can be inferred. Therefore, the stored topology is updated to reflect the RC 214c as a direct child of the ND2 212(2). Consequently, the detected topology is as illustrated in a topology 600a of FIG. 6A.

When the monitoring system 202 queries the ND4 212(4), the monitoring system 202 receives the topology information indicated for the ND4 212(4) in Table 1. Because the ND4 212(4) has no downstream endpoints and no endpoint-via-remote information, no parent references can be inferred. Therefore, the stored topology is updated to reflect the RE 214e as a direct child of the ND4 212(4). The detected topology is as illustrated in a topology 600b of FIG. 6B.

When the monitoring system 202 queries the ND1 212(1), the monitoring system 202 receives the topology information indicated for the ND1 212(1) in Table 1. The monitoring system 202 updates the stored topology to reflect the RA 214a and the RB 214b as direct children of the ND1 212(1). In addition, the ND2 212(2), the ND3 212(3), and the ND4 212(4) are identified as downstream endpoints of the ND1 212(1). At this point, for each networking device of the ND2 212(2), the ND3 212(3), and the ND4 212(4), the ND1 212(1) is the most-downstream networking device that lists the networking device as a downstream endpoint. Also, endpoint-via-remote information for the ND1 212(1) identifies the RA 214a as linking it (possibly indirectly) with each of the ND2 212(2), the ND3 212(3), and the ND4 212(4). Therefore, a parent reference for each of the ND2 212(2), the ND3 212(3), and the ND4 212(4) can be inferred and set to an identifier for the RA 214a (e.g., <MAC-n>). The detected topology is as illustrated in a topology 600c of FIG. 6C.

When the monitoring system 202 queries the ND3 212(3), the monitoring system 202 receives the topology information indicated for the ND3 212(3) in Table 1. The monitoring system 202 updates the stored topology to reflect the RD 214d as a direct child of the ND3 212(3). In addition, the ND4 212(4) is identified as a downstream endpoint of the ND3 212(3). Also, endpoint-via-remote information for the ND3 212(3) identifies the RD 214d as linking it with the ND4 212(4). Now, the ND3 212(3) is the most-downstream networking device that lists the ND4 212(4) as a downstream endpoint. Therefore, based on the endpoint-via-remote information for the ND3 212(3), the parent reference for the ND4 212(4) is updated to be set to an identifier for the RD 214d (e.g., <MAC-s>). The detected topology is as illustrated in a topology 600d of FIG. 6D. Because there are no further networking devices to query, the detected network topology (i.e., the topology 600d) can be considered a full network topology of the monitored information handling systems 210 of FIG. 2.

In various embodiments, network topologies can change over time. The changes can include, for example, networking devices being de-authorized from inclusion in a list of managed networking devices, changes in how monitored information handling systems are interconnected, the addition or removal of monitored information handling systems, and/or the like. Consequently, in these embodiments, a process similar to the process 500 of FIG. 5 can be repeated at periodic intervals to update a stored network topology. An example will be described below.

Figure 7:
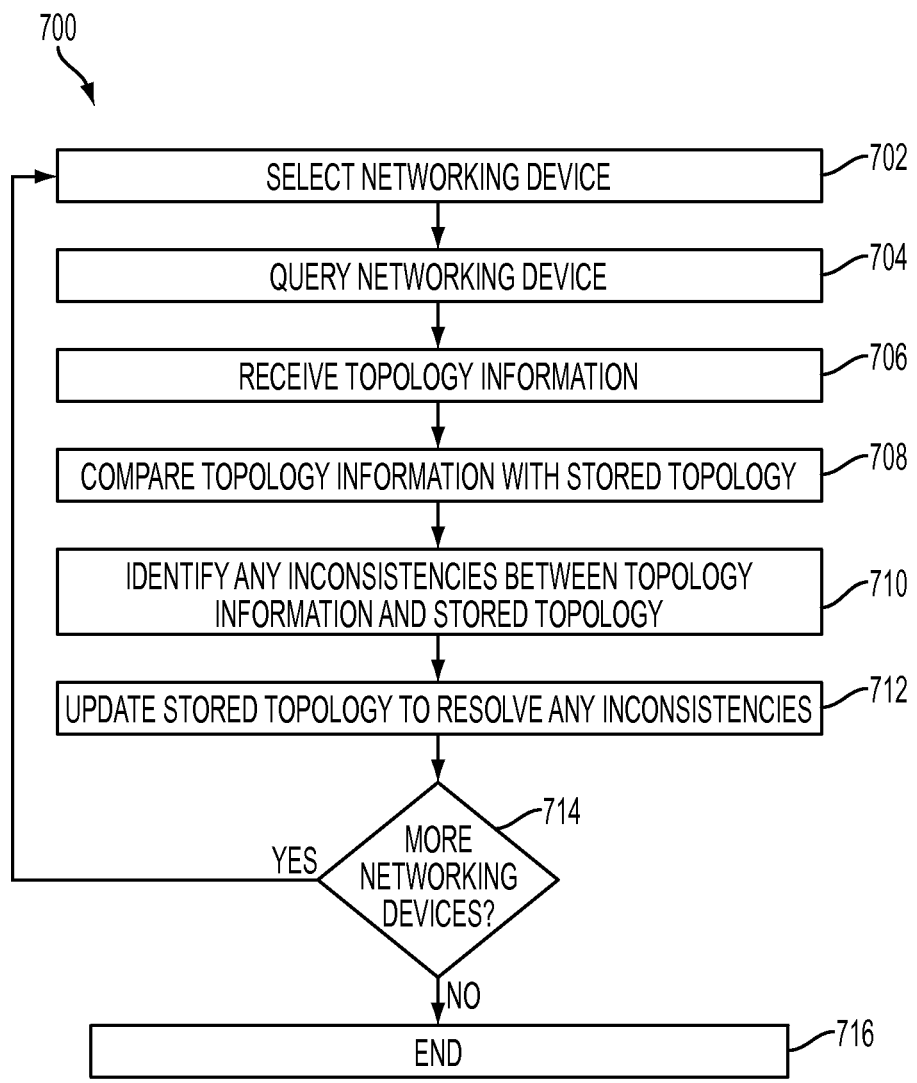
FIG. 7 illustrates a process for adapting a stored network topology to network changes.

FIG. 7 illustrates a process 700 for adapting a stored network topology to network changes. The process 700 may be performed by a monitoring system such as, for example, the monitoring system 102 of FIG. 1 or the monitoring system 202 of FIG. 2. The process 700 begins at step 702. At step 702, the monitoring system selects a networking device as described with respect to step 502 of the process 500. From step 702, the process 700 proceeds to step 704. At step 704, the monitoring system queries the selected networking device for topology information as described with respect to step 504 of the process 500. From step 704, the process 700 proceeds to step 706. At step 706, the monitoring system receives the topology information as described with respect to step 506 of the process 500. From step 706, the process 700 proceeds to step 708.

At step 708, the monitoring system compares the topology information with the stored topology. From step 708, the process 700 proceeds to step 710. At step 710, the monitoring system identifies any inconsistencies between the topology information and the stored topology. The inconsistencies can include, for example, a new remote node, one or more incorrect parent references, and/or the like. Step 710 can include adding any new directly connected nodes and determining any new parent references as described with respect to steps 508 and 510, respectively, of the process 500. From step 710, the process 700 proceeds to step 712. At step 712, the monitoring system updates the stored topology to resolve any inconsistencies identified at step 710. From step 712, the process 700 proceeds to step 714. At step 714, the monitoring system determines whether there are additional networking devices through which the process 700 has not yet iterated in a similar fashion to that described with respect to step 512 of the process 500. If so, the process 700 returns to step 702 for selection of another networking device. Otherwise, if it is determined at step 714 that there are no additional networking devices through which the process 700 has not yet iterated, the process 700 proceeds to step 716 and ends.

Figure 6A:
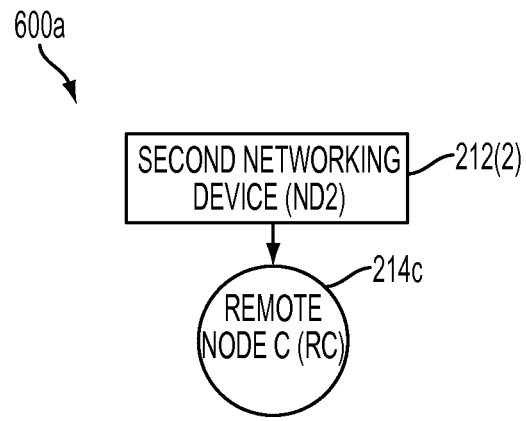
FIGS. 6A-6D illustrate an example of topology detection.
Figure 6B:
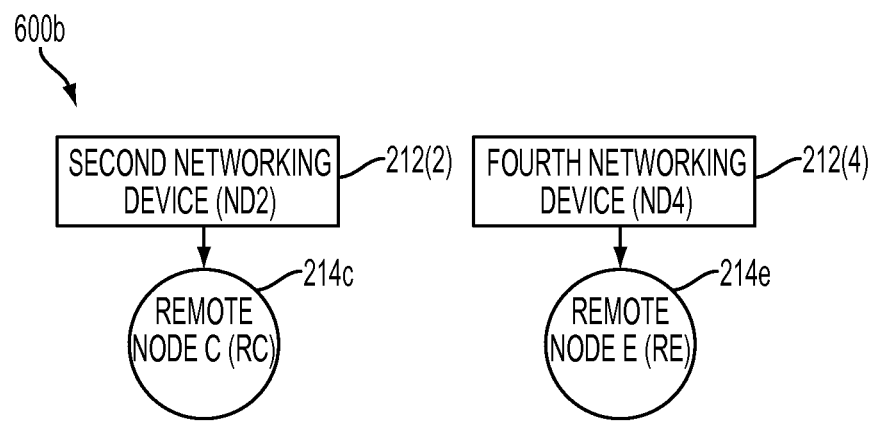
Figure 6C:
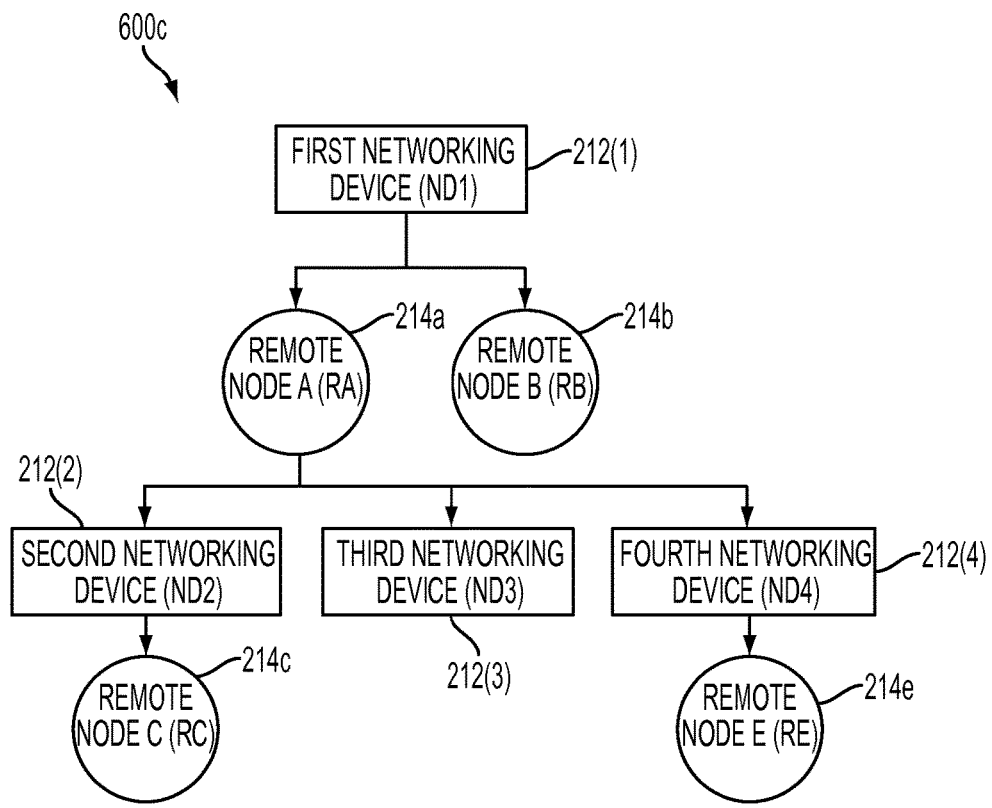
Figure 6D:
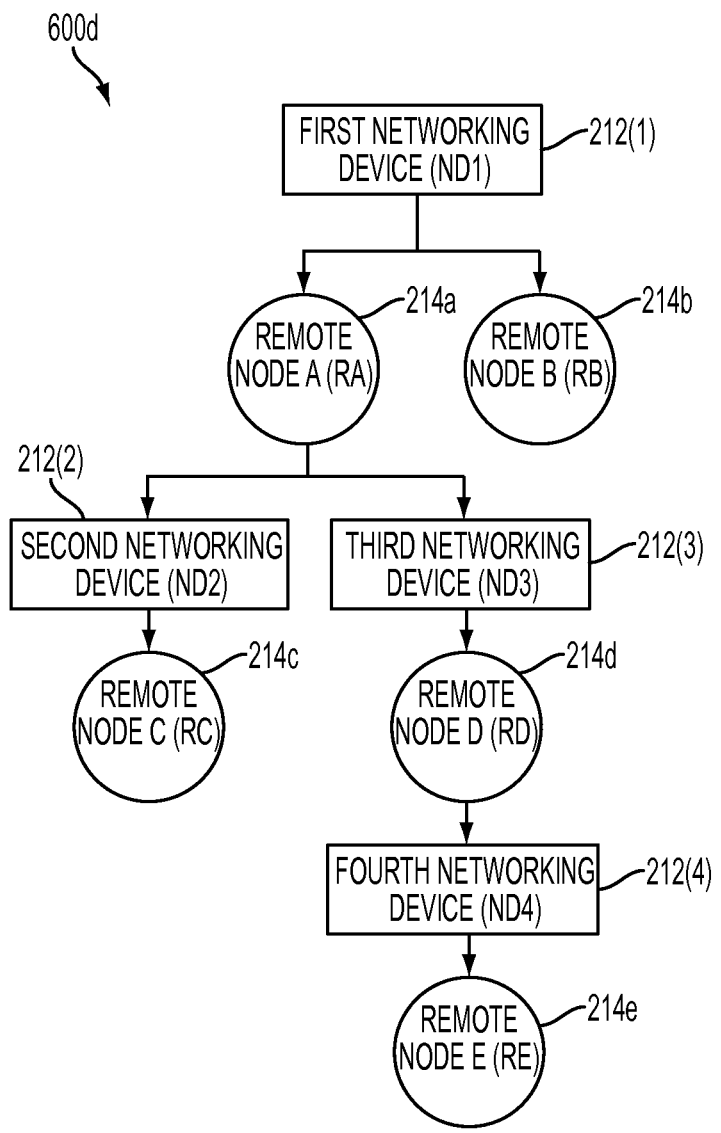
Figure 8:
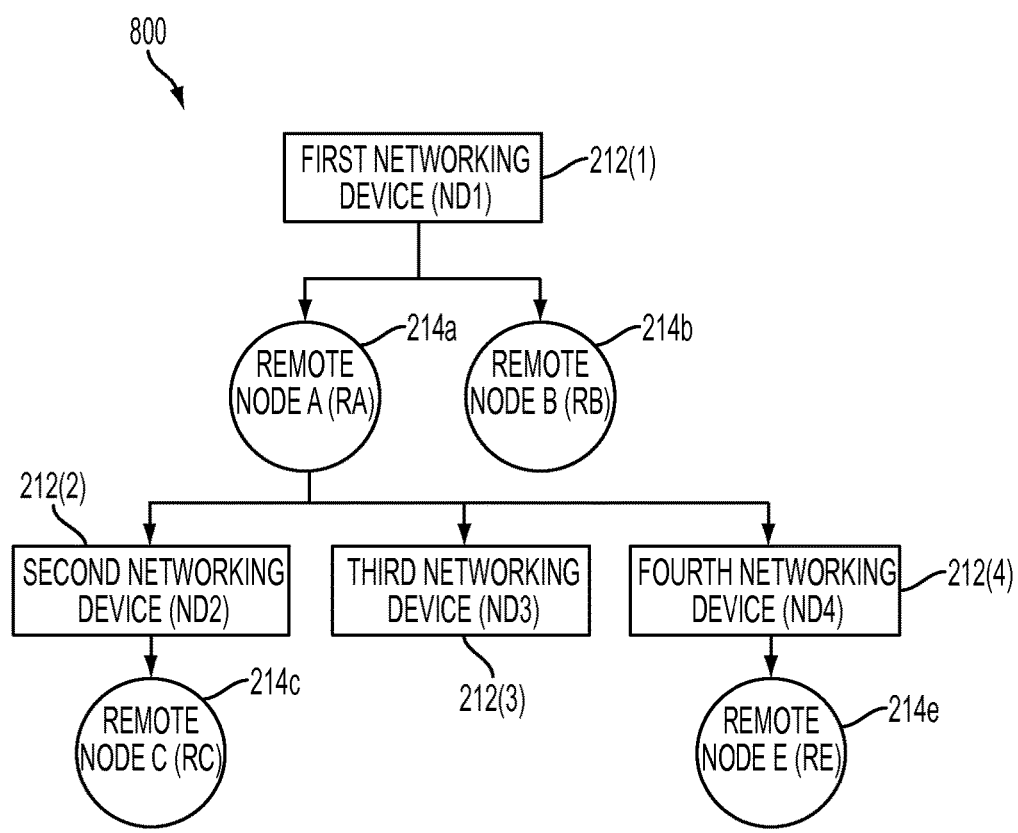
FIG. 8 illustrates an example of a topology that has been adapted.

FIG. 8 illustrates an example of a topology 800 that has been adapted from the topology 600d of FIG. 6D. In particular, the ND3 212(3) has been de-authorized from inclusion in a list of managed networking devices such as, for example, the list of managed networking devices 426 of FIG. 4. The ND3 212(3) may have been de-authorized, for example, by a user or administrator. Therefore, in a typical embodiment, the ND3 212(3) is not queried for topology information while de-authorized. Via a process such as, for example, the process 700 of FIG. 7, the monitoring system 202 infers and sets the parent reference of the ND3 212(3) to the identifier of the RA 214a. In addition, the monitoring system 202 infers and sets the parent reference of the ND4 212(4) to the identifier of the RA 214a.

Figure 9:
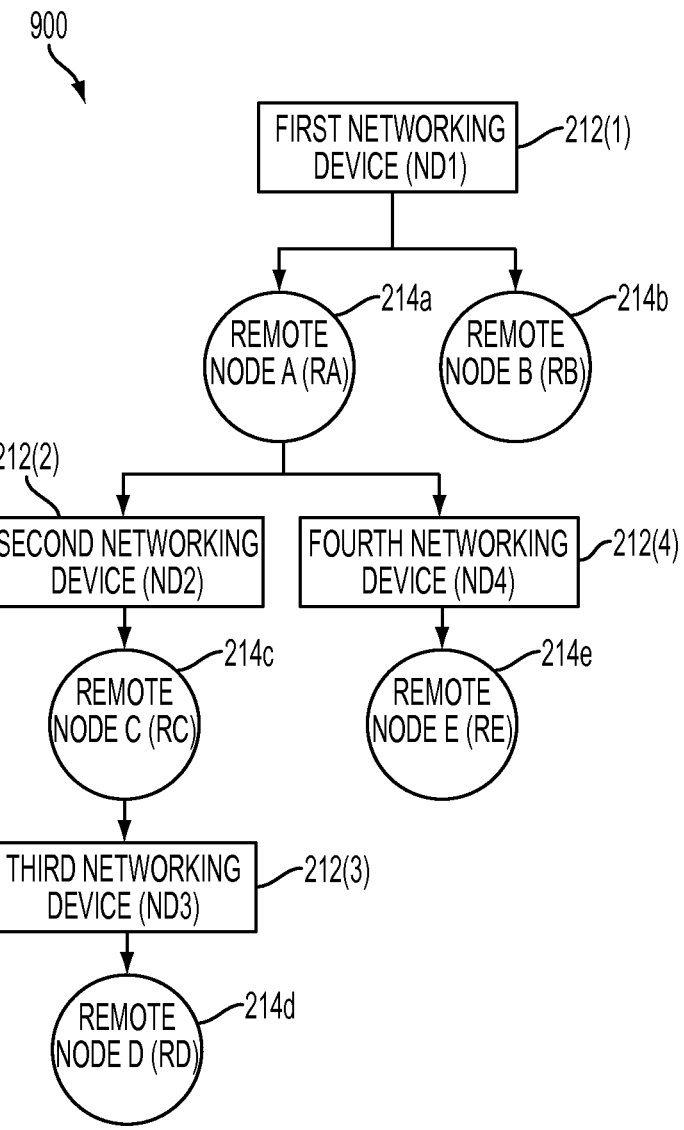
FIG. 9 illustrates an example of a topology that has been adapted.

FIG. 9 illustrates an example of a topology 900 that has been adapted from the topology 800 of FIG. 8. In particular, the ND3 212(3) has been reauthorized for inclusion in the list of managed networking devices and has been connected to the RC 214c. Also, the ND4 212(4) has been connected to the RA 214*a*. Via a process such as, for example, the process 700 of FIG. 7, the monitoring system 202 infers and sets the parent reference of the ND3 212(3) to the identifier of the RC 214*c*. In similar fashion, the monitoring system 202 infers and sets the parent reference of the ND4 212(4) to the identifier of the RA 214*a*.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on a monitoring system, monitoring a network, wherein the network is hierarchical and directional and comprises a plurality of information handling systems;
    wherein the plurality of information handling systems comprises a plurality of computer-networking devices and a plurality of remote nodes;
    creating, by the monitoring system, a stored network topology that is representative of a current state of the network;
    wherein the stored network topology comprises, for each of the plurality of networking devices, any direct children;
    wherein the creating comprises, for each networking device of the plurality of computer-networking devices:
        selecting the networking device;
        querying the networking device for topology information,
        receiving the topology information from the networking device;
        wherein the topology information comprises a list of any directly connected remote nodes, a list of any downstream endpoints, and endpoint-via-remote information for each downstream endpoint;
        adding any directly connected remote nodes to the stored network topology;
        determining any new parent references that can be inferred based on the topology information; and
        updating the stored network topology according to the new parent references.

2. The method of claim 1, comprising adapting the stored network topology to at least one network change.

3. The method of claim 2, wherein the adapting comprises, for each networking device of the plurality of networking devices:
    selecting the networking device;
    querying the networking device for new topology information;
    receiving the new topology information from the networking device;
    comparing the new topology information with the stored topology;
    identifying any inconsistencies between the new topology information and the stored topology; and
    updating the stored topology to resolve any identified inconsistencies.

4. The method of claim 2, wherein:
    the monitoring system maintains a list of managed networking devices, the managed networking devices comprising those computer-networking devices from which the monitoring system is authorized to collect the topology information; and
    the managed networking devices comprises the plurality of computer-networking devices.

5. The method of claim 4, wherein the at least one network change comprises at least one of an addition and a removal relative to the list of managed networking devices.

6. The method of claim 4, wherein the monitoring system iterates through the list in a predetermined order.

7. The method of claim 1, wherein the endpoint-via-remote information identifies, for each endpoint in the list of downstream endpoints, via which directly connected remote node of the networking device that the endpoint is connected to the networking device.

8. The method of claim 1, wherein:
    the stored network topology comprises, for each of the plurality of networking devices, a parent reference; and
    the determining comprises:
        for at least one networking device of the plurality of networking devices, identifying a most-downstream networking device of the plurality computer-networking devices that lists the at least one networking device in its list of downstream endpoints;
        wherein the endpoint-via-remote information of the most-downstream networking device identifies a directly connected remote node thereof as linking the most-downstream networking device and the at least one networking device; and
        setting the parent reference of the at least one networking device to an identifier for the identified directly connected remote node.

9. The method of claim 8, wherein the identifier for the identified directly connected remote node comprises a media access control (MAC) address.

10. The method of claim 1, wherein the monitoring system comprises an industrial control system.

11. The method of claim 1, wherein the creating comprises creating a stored network topology for each of a plurality of distinct networks.

12. An information handling system, comprising:
    a processing unit, wherein the processing unit is operable to implement a method comprising:
        monitoring a network, wherein the network is hierarchical and directional and comprises a plurality of information handling systems;
        wherein the plurality of information handling systems comprises a plurality of computer-networking devices and a plurality of remote nodes;
        creating a stored network topology that is representative of a current state of the network;
        wherein the stored network topology comprises, for each of the plurality of networking devices, any direct children;
        wherein the creating comprises, for each networking device of the plurality of computer-networking devices:
            selecting the networking device;
            querying the networking device for topology information,
            receiving the topology information from the networking device;
            wherein the topology information comprises a list of any directly connected remote nodes, a list of any downstream endpoints, and endpoint-via-remote information for each downstream endpoint;
            adding any directly connected remote nodes to the stored network topology;
            determining any new parent references that can be inferred based on the topology information; and updating the stored network topology according to the new parent references.

13. The information handling system of claim 12, the method comprising adapting the stored network topology to at least one network change.

14. The information handling system of claim 13, wherein the adapting comprises, for each networking device of the plurality of networking devices:
   selecting the networking device;
   querying the networking device for new topology information;
   receiving the new topology information from the networking device;
   comparing the new topology information with the stored topology;
   identifying any inconsistencies between the new topology information and the stored topology; and
   updating the stored topology to resolve any identified inconsistencies.

15. The information handling system of claim 13, wherein:
   the information handling system maintains a list of managed networking devices, the managed networking devices comprising those computer-networking devices from which the information handling system is authorized to collect the topology information; and
   the managed networking devices comprises the plurality of computer-networking devices.

16. The information handling system of claim 15, wherein the at least one network change comprises at least one of an addition and a removal relative to the list of managed networking devices.

17. The information handling system of claim 15, wherein the information handling system iterates through the list in a predetermined order.

18. The information handling system of claim 12, wherein the endpoint-via-remote information identifies, for each endpoint in the list of downstream endpoints, via which directly connected remote node of the networking device that the endpoint is connected to the networking device.

19. The information handling system of claim 12, wherein:
   wherein the stored network topology comprises, for each of the plurality of networking devices, a parent reference; and
   wherein the determining comprises:
      for at least one networking device of the plurality of networking devices, identifying a most-downstream networking device of the plurality computer-networking devices that lists the at least one networking device in its list of downstream endpoints;
      wherein the endpoint-via-remote information of the most-downstream networking device identifies a directly connected remote node thereof as linking the most-downstream networking device and the at least one networking device; and
      setting the parent reference of the at least one networking device to an identifier for the identified directly connected remote node.

20. A computer-program product comprising a non-transitory computer-usable medium having computer-readable program code embodied therein, the computer-readable program code adapted to be executed to implement a method comprising:
   monitoring a network, wherein the network is hierarchical and directional and comprises a plurality of information handling systems;
   wherein the plurality of information handling systems comprises a plurality of computer-networking devices and a plurality of remote nodes;
   creating a stored network topology that is representative of a current state of the network;
   wherein the stored network topology comprises, for each of the plurality of networking devices, any direct children;
   wherein the creating comprises, for each networking device of the plurality of computer-networking devices:
      selecting the networking device;
      querying the networking device for topology information,
      receiving the topology information from the networking device;
      wherein the topology information comprises a list of any directly connected remote nodes, a list of any downstream endpoints, and endpoint-via-remote information for each downstream endpoint;
      adding any directly connected remote nodes to the stored network topology;
      determining any new parent references that can be inferred based on the topology information; and
      updating the stored network topology according to the new parent references.

* * * * *